(12) United States Patent
McCaffrey et al.

(10) Patent No.: US 7,075,966 B2
(45) Date of Patent: Jul. 11, 2006

(54) ELECTRODE COLUMN

(75) Inventors: Felim P. McCaffrey, Toronto (CA); Blair Nakatsu, Dartmouth (CA); Nils W. Voermann, Toronto (CA); Maurizio Darini, Toronto (CA); Sean Southall, Cambridge (CA)

(73) Assignee: Hatch, Ltd., Mississauga (CA)

( * ) Notice: Subject to any disclaimer, the term of this patent is extended or adjusted under 35 U.S.C. 154(b) by 0 days.

(21) Appl. No.: 10/850,170

(22) Filed: May 20, 2004

(65) Prior Publication Data

US 2005/0259711 A1  Nov. 24, 2005

(51) Int. Cl.
*H05B 7/10* (2006.01)
(52) U.S. Cl. .................. 373/100; 373/69; 373/101
(58) Field of Classification Search ........... 373/94–96, 373/100–106, 38, 51–55, 69
See application file for complete search history.

(56) References Cited

U.S. PATENT DOCUMENTS

| | | | |
|---|---|---|---|
| 2,845,468 A * | 7/1958 | Johan .................... | 373/100 |
| 3,247,305 A * | 4/1966 | George ................... | 373/100 |
| 3,634,589 A | 1/1972 | Krogsrud | |
| 3,801,718 A | 4/1974 | Baglai et al. | |
| 3,898,364 A | 8/1975 | Hardin | |
| 4,227,030 A * | 10/1980 | Osterwold ............... | 373/100 |
| 4,243,832 A | 1/1981 | Parsons et al. | |
| 4,292,460 A | 9/1981 | Frolov et al. | |
| 4,307,870 A | 12/1981 | Sandvik | |
| 4,417,345 A | 11/1983 | Krogsrud | |
| 4,422,172 A * | 12/1983 | Dunn et al. ............... | 373/94 |
| 4,424,584 A | 1/1984 | Evensen | |
| 4,435,817 A | 3/1984 | Krogsrud | |
| 4,438,516 A | 3/1984 | Krogsrud | |
| 4,481,637 A | 11/1984 | Evensen | |
| 4,527,329 A | 7/1985 | Bruff et al. | |
| 4,543,656 A | 9/1985 | Evensen | |
| 4,550,413 A | 10/1985 | Lassander et al. | |
| 4,612,151 A | 9/1986 | Bruff et al. | |
| 4,646,317 A | 2/1987 | Evensen | |
| 5,146,469 A | 9/1992 | Svana | |
| 5,297,160 A | 3/1994 | Kroker | |

* cited by examiner

*Primary Examiner*—Tu Hoang
(74) *Attorney, Agent, or Firm*—Kirkpatrick & Lockhart Nicholson Graham LLP

(57) ABSTRACT

A system is disclosed for lowering ("slipping") and/or raising ("back slipping") electrodes relative to an electrode column. The system includes an electrode column having at least one slipping sleeve and a power clamp, each of which apply a radial clamping force to the electrode. The magnitudes of the clamping forces are selected such that application of a downwardly directed axial force on the one or more slipping sleeves, in combination with the weight of the electrode, are sufficient to overcome the resistive force of the power clamp, resulting in downward movement of the electrode without release of the clamping forces. Electrode columns having two movable slipping sleeves are also capable of raising the electrode relative to the furnace without release of the clamping forces.

18 Claims, 6 Drawing Sheets

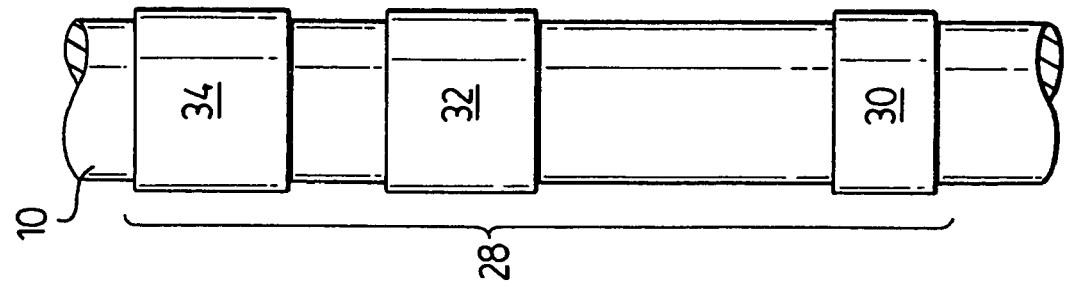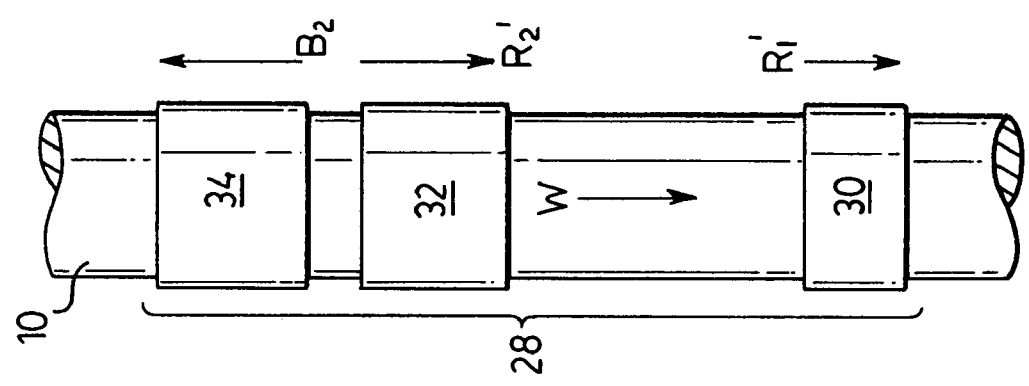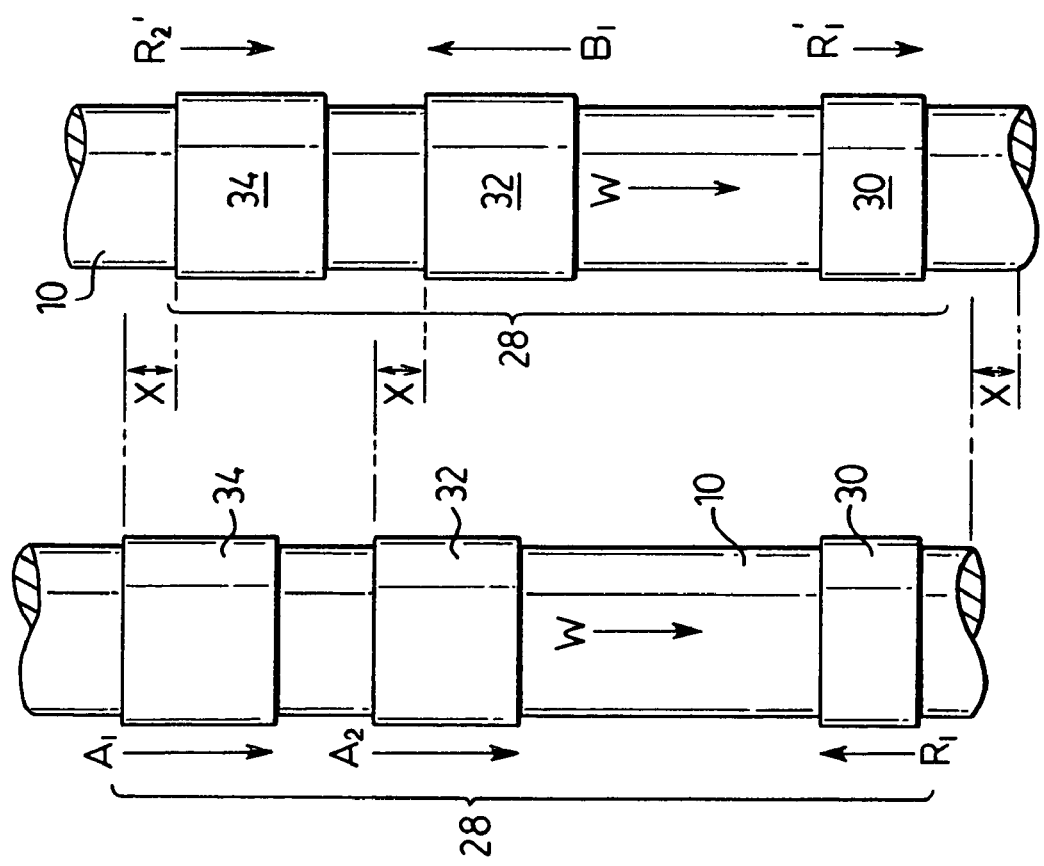

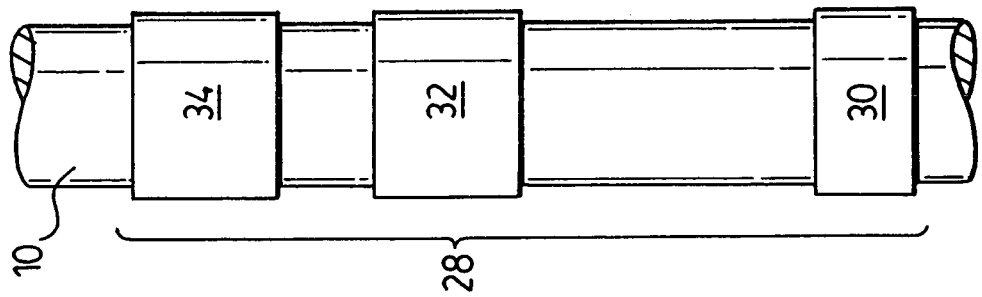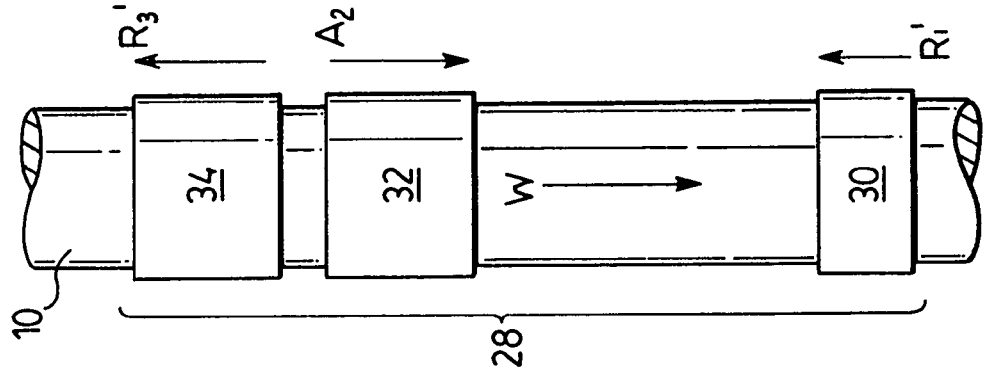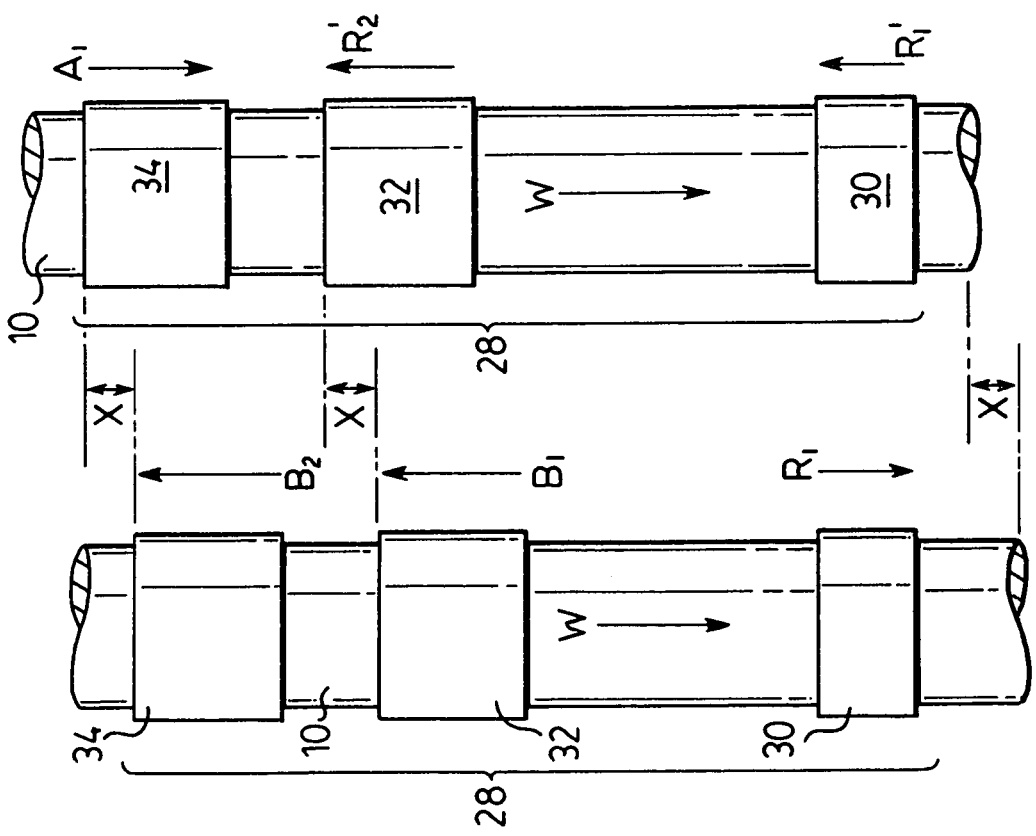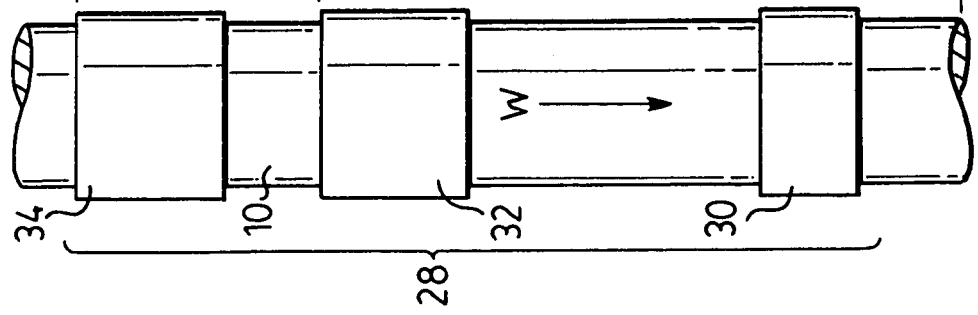

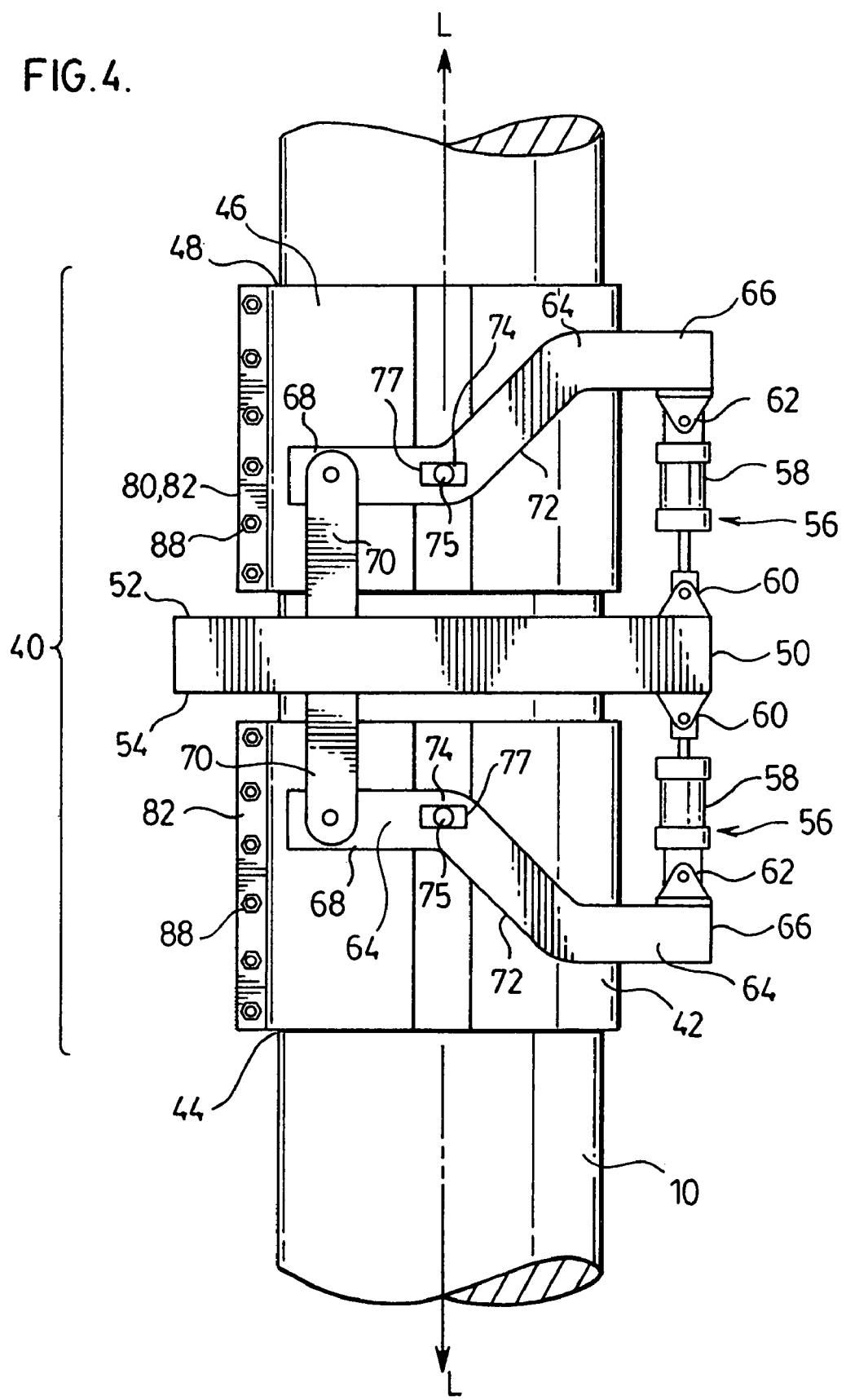

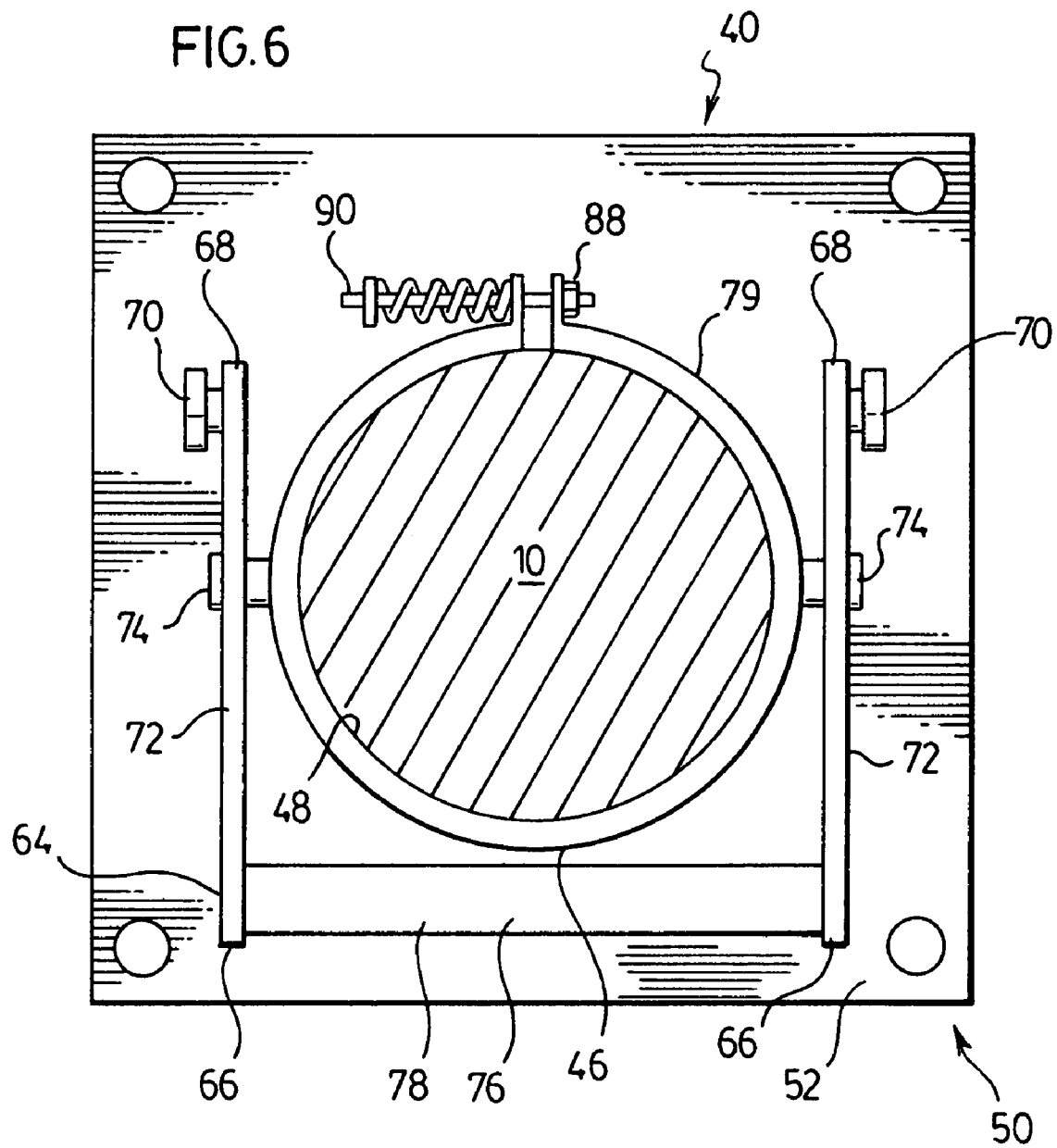

ELECTRODE COLUMN

FIELD OF THE INVENTION

The present invention relates to electrode columns for use with electric furnaces, and particularly to electrode slipping systems such electrode columns.

BACKGROUND OF THE INVENTION

Electric furnaces are commonly used for melting of metals and for smelting and reduction of ores. In such furnaces, heat is typically supplied to the furnace charge through one or more cylindrical electrodes, each of which is vertically suspended through the furnace roof by an electrode column.

The electrode column not only supports the electrode, but is also responsible for carrying electrical power to the electrodes, positioning the electrodes based on furnace power requirements, incrementally feeding or "slipping" the electrodes downward into the furnace as they are consumed and, where the electrodes are of the Soderberg type, helping in the baking of the electrodes. It is also desirable to be able to move the electrode incrementally upward, for example to correct for over-slipping or to compensate for rapid bath rise in the furnace.

In order to perform these functions, a typical electrode column comprises a hoist to control the position of the electrode, an electrode slipping system to incrementally feed the electrode through the electrode column and into the furnace, a paste heater to soften unbaked paste blocks and ensure correct baking of the electrode, a power clamp to deliver electrical power to the electrode, and an electrode seal to prevent excessive release of harmful gases from the opening in the furnace roof through which the electrode extends.

The power clamp typically comprises a number of copper contact pads which are biased against the surface of the electrode to maintain electrical contact with the electrode. This clamping force of the electrode clamp on the electrode through the contact pads is continuously applied, typically only being released for maintenance.

The electrode slipping system typically comprises a slipping clamp assembly having one or two slipping sleeves which apply a radial clamping force to support the electrode. In prior art slipping clamp assemblies, at least one of the slipping sleeves is provided with means to release the clamping force, thereby permitting the electrode to "slip" downward relative to the electrode column.

A description of a typical prior art system for incrementally raising and lowering an electrode is the "two-ring" system described at column 1, lines 20 to 34, of U.S. Pat. No. 4,481,637 (Evensen) issued on Nov. 6, 1984. According to this system, two holder rings are provided which exert radial forces on the electrode. When feeding the electrode downwardly into the furnace, the pressure of the first of the holder rings is released and the first ring is moved vertically relative to the second holder ring and the electrode, following which the pressure on the first holder ring is reactivated. The pressure on the holder ring is then released and the electrode is fed down by lowering the first holder ring. When the feeding movement is finished, the pressure on the second holder ring is reactivated. Therefore, this two-ring system involves releasing the pressure on at least one of the holder rings during feeding of the electrode.

Another prior art electrode slipping mechanism is described in U.S. Pat. No. 4,243,832 (Parsons et al.) issued on Jan. 6, 1981. The Parsons et al. patent describes and illustrates an electrode slipping system in which two sets of girdle clamps 5,6 are arranged inside a support frame 3, the frame 3 being provided with a lever arm 10 having a double acting ram 11. In order to lower the electrode, the ram 11 is extended with the clamps 6 tightened about the electrode. Extension of ram 11 causes lowering of end 13 of lever arm 10, resulting in the electrode being slipped downwardly against the friction of clamps 5. After the electrode is lowered, the clamps 6 are loosened and moved upwardly to their initial positions. In order to raise the electrode, the clamping forces of the lower clamps 6 are released, and the ram 11 is then extended to lower the clamps 6, after which the clamping force of clamps 6 are reactivated. The clamps 6 are then raised in relation to clamps 5, raising the electrode against the frictional force of clamps 5. Although the clamping forces applied to the electrode by the upper set of clamps 5 are sufficient to support the electrode, the Parsons et al. system nevertheless involves release of the lower clamps 6 during raising and lowering of the electrode.

Another prior art electrode slipping system is described in U.S. Pat. No. 3,898,364 (Hardin) issued on Aug. 5, 1975. The Harden patent discloses a system having a contact clamp 14, a slipping clamp 16 and a torquing clamp 18, each of which can be tightened and released. During operation, the electrode is supported by the contact clamp 14 and is lowered by releasing the clamping pressure on clamps 16 and 18 and moving clamp 14 down relative to 16. Thus, the Hardin patent also discloses a system in which the clamping pressure on the electrode is released.

As the weight of a typical electrode is substantial, being on the order of about 40 tons, the release of clamping pressure on the electrode during feeding or slipping is undesirable, as the safety factor against dropping the electrode is reduced when one or more clamps is released. Accordingly, there is a need for improved electrode slipping systems in which release of clamping forces on the electrodes is avoided.

SUMMARY OF THE INVENTION

The present invention overcomes the problems of the prior art described above by providing an electrode slipping system in which the electrode can be raised or lowered relative to the electrode column without release of the clamping forces on the electrode.

In the electrode slipping system according to the invention, the electrode column is provided with a slipping clamp assembly comprising at least one movable slipping sleeve which applies a radial clamping force to the electrode. The combined clamping forces of the slipping clamp assembly and the power clamp are sufficient to support the electrode. The magnitudes of the clamping forces applied by the slipping sleeve and by the power clamp are selected such that application of a downwardly directed axial force on the slipping sleeve, in combination with the weight of the electrode, are sufficient to overcome the resistive frictional force of the power clamp, thereby resulting in slippage of the electrode relative to the power clamp without release of the clamping forces. The slipping sleeve can then be raised to its initial position without the release of clamping forces by application of an upwardly directed axial force which is insufficient to overcome the combined weight of the electrode and the resistive frictional force of the power clamp so that the slipping sleeve slides upwardly along the electrode, back to its initial position.

In particularly preferred embodiments of the present invention, the slipping clamp assembly includes a second slipping sleeve, which may be either stationary or movable relative to the electrode column. Where the second slipping sleeve is movable, the electrode may be raised or "back-slipped" relative to the electrode column by simultaneously applying upwardly directed axial forces on both slipping sleeves, again without releasing the pressure of the slipping sleeves or the power clamp. The slipping sleeves are then moved sequentially downwards relative to the electrode column, so that the slipping sleeves slide downwardly along the electrode back to their initial positions, without the release of clamping force. Downward slipping is accomplished by applying a downwardly directed axial force on one or both sleeves as described in the previous paragraph.

In one aspect, the present invention provides, in combination, a consumable electrode and an electrode column for an electric arc furnace. The electrode is movable downwardly along a longitudinal axis defined by the electrode. The electrode column comprises: (a) a power clamp through which electrical power is delivered to the electrode, the power clamp comprising an annular contact element through which the electrode extends and which is in contact with the electrode, the power clamp exerting a first clamping force on the electrode through said annular contact element; and (b) a slipping clamp assembly comprising at least a first slipping sleeve, the first slipping sleeve having a hollow cylindrical interior through which the electrode extends, the first slipping sleeve exerting a second clamping force on the electrode and being axially movable relative to the electrode and the power clamp. The power clamp and the slipping clamp assembly together support the electrode and the first and second clamping forces are selected such that downward axial movement of the first slipping sleeve, while maintaining the first and second clamping forces, results in downward axial movement of the electrode relative to the power clamp, and such that upward axial movement of only the first slipping sleeve, while maintaining the first and second clamping forces, results in axial movement of the first slipping sleeve relative to the electrode.

In another aspect, the present invention provides a slipping clamp assembly for holding an axially-extending electrode and for axially raising and lowering the electrode. The slipping clamp assembly comprises: (a) a first slipping sleeve for exerting a first clamping force on the electrode, the first slipping sleeve having a hollow cylindrical interior to receive the electrode; (b) a second slipping sleeve for exerting a second clamping force on the electrode, the second slipping sleeve having a hollow cylindrical interior to receive the electrode, the first and second slipping sleeves being axially spaced apart; and (c) a slipping clamp frame to which both slipping sleeves are connected, both the first and second slipping sleeves being axially movable relative to the frame and independent of one another.

In yet another aspect, the present invention provides a method of axially moving an electrode relative to an electric arc furnace, the electrode being supported by a power clamp and by a slipping clamp assembly. The slipping clamp assembly comprises a first slipping sleeve having a hollow interior through which the electrode extends. The method comprises: (a) applying a first clamping force to the electrode, the first clamping force being applied by the power clamp; (b) applying a second clamping force to the electrode, the second clamping force being applied by the first slipping sleeve; and (c) applying an axially downwardly directed force on the first slipping sleeve while maintaining the first and second clamping forces on the electrode, wherein a combination of the downwardly directed force on the slipping sleeve and a downward force of the electrode are greater than a resistive frictional force of the power clamp, resulting in downward axial displacement of the first slipping sleeve and the electrode relative to the power clamp and the furnace.

In yet another aspect, the present invention provides a method of axially moving an electrode relative to an electric arc furnace, the electrode being supported by a power clamp and by a slipping clamp assembly. The slipping clamp assembly comprises a first slipping sleeve having a hollow interior through which the electrode extends, and a second slipping sleeve having a hollow interior through which the electrode extends. The method comprises: (a) applying a first clamping force to the electrode, the first clamping force being applied by the power clamp; (b) applying a second clamping force to the electrode, the second clamping force being applied by the first slipping sleeve; (c) applying a third clamping force to the electrode, the third clamping force being applied by the second slipping sleeve; and (d) applying an axially upwardly directed force on each of the first slipping sleeve and the second slipping sleeve while maintaining the first, second and third clamping forces on the electrode, wherein a combination of the upwardly directed forces on the slipping sleeve is greater than a downward force of the electrode and a resistive frictional force of the power clamp, resulting in upward axial displacement of the slipping sleeves and the electrode relative to the power clamp and the furnace.

BRIEF DESCRIPTION OF THE DRAWINGS

The invention will now be described, by way of example only, with reference to the accompanying drawings, in which:

FIG. 2a to 2d illustrate an electrode slipping system according to an embodiment of the present invention including two slipping sleeves, in which both slipping sleeves are movable, and a preferred method by which an electrode is fed downwardly using this system;

FIGS. 3a to 3d illustrate a method by which the electrode slipping system of FIG. 2 is used for upward, back slipping of the electrode;

FIG. 4 is a side elevation view of a preferred slipping system according to the present invention, comprising two movable slipping sleeves;

FIG. 6 is a top plan view, partly in cross section, of the electrode slipping system of FIG. 4.

DETAILED DESCRIPTION OF PREFERRED EMBODIMENTS

FIG. 1 to 3 are schematic illustrations showing the operation of preferred electrode slipping systems according to the present invention.

Figure 1C:
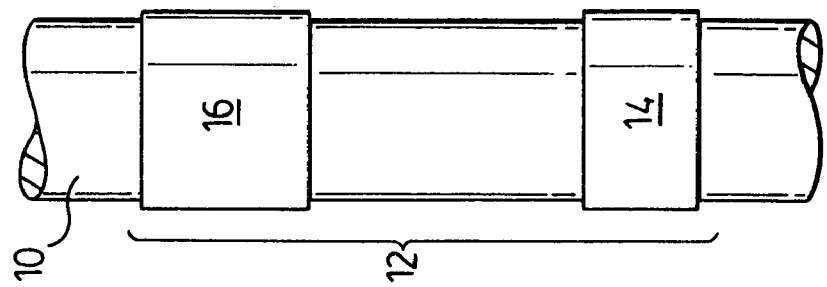
FIG. 1a to 1c illustrate a preferred electrode slipping system according to the present invention including one slipping sleeve, and the method by which the electrode is fed downwardly using this system.
Figure 1B:
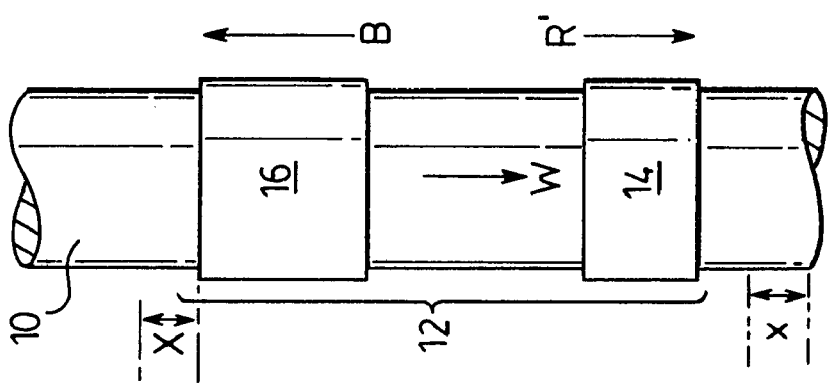
Figure 1A:
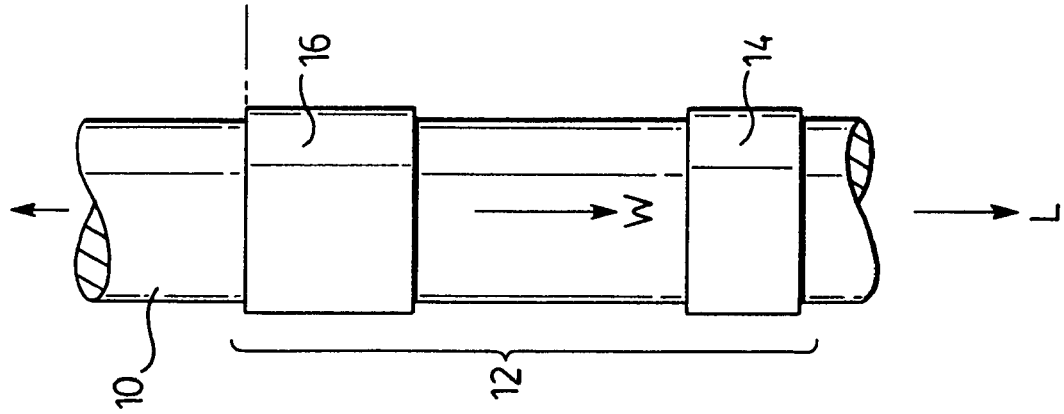

FIG. 1a to 1c schematically illustrate a consumable electrode 10 for an electric arc furnace (not shown) being supported by an electrode column 12, of which only the power clamp 14 and slipping sleeve 16 are shown. The remaining components of the electrode column 12 are not shown since they are not necessary for an understanding of the invention as described with reference to FIG. 1a to 1c. It will be appreciated that the electrode column may also be provided with the other components mentioned above, and that the slipping sleeve comprises part of a slipping clamp assembly which also includes other components as more fully described below.

As mentioned above, the electrode 10 is suspended vertically and defines a longitudinal axis L shown in FIG. 1a.

FIG. 1a to 1c illustrate the steps involved in incrementally feeding the electrode 10 downwardly along the longitudinal axis into the furnace. The power clamp 14 comprises an annular contact element through which the electrode extends and which is in contact with the electrode 10. The power clamp 14 exerts a first radial clamping force on the electrode 10 through the annular contact element.

The slipping sleeve 16 has a hollow cylindrical interior through which the electrode 10 extends. The first slipping sleeve 16 exerts a second radial clamping force on the electrode 10 and is movable in the axial direction relative to the electrode 10 and the power clamp 14.

In order to displace the electrode 10 downwardly along the longitudinal axis L, an axially directed downward force is applied on slipping sleeve 16 in the direction of arrow A, while maintaining the clamping forces of power clamp 14 and slipping sleeve 16.

It will be appreciated that the weight of electrode 10 constitutes a downward force which is directed parallel to the longitudinal axis L and is represented in FIG. 1a by arrow W. The forces A and W shown in FIG. 1a are countered by a resistive frictional force of the power clamp 14, represented by arrow R in FIG. 1a. The magnitudes of the clamping forces produced by power clamp 14 and sleeve 16 are selected such that downward axial movement of the slipping sleeve 16, without release of the clamping forces, results in downward axial movement of the electrode 10 relative to power clamp 14. In other words, the combined magnitude of the forces represented by arrows A and W is greater than the resistive force R, and therefore the electrode 10 is caused to slip downwardly through the power clamp 14 to the position shown in FIG. 1b, thus feeding the electrode 10 by an amount X into the furnace.

To complete the process of lowering electrode 10, the slipping sleeve 16 must be returned to its initial position. Thus, an upwardly directed axial force represented by arrow B in FIG. 1b is applied to the slipping sleeve 16. This force B is opposed by the weight W of the electrode 10, and is also resisted by the frictional force of power clamp 14 on electrode 10, represented by arrow R' in FIG. 1b. The magnitudes of the clamping forces are selected such that the upward axial movement of only slipping sleeve 16, while maintaining the clamping forces of power clamp 14 and slipping sleeve 16, results in upward axial movement of the slipping sleeve 16 relative to electrode 10. In other words, the magnitude of force B is insufficient to overcome the combined effect of forces W and R', and therefore the slipping sleeve 16 slides upwardly on the electrode 10. It is emphasized that the upward displacement of slipping sleeve 16 is accomplished without release of the clamping forces of power clamp 14 or slipping sleeve 16, and that there is substantially no slippage of the electrode relative to the power clamp 14. The final position of slipping sleeve 16 is illustrated in FIG. 1c. The electrode 10 can be further fed into the furnace by repeating the steps shown in FIG. 1a to 1c.

FIGS. 2a to 2d and 3a to 3d schematically illustrate a second preferred embodiment of the present invention comprising an electrode column 28 in combination with electrode 10 for an electric arc furnace (not shown). The electrode column 28 in the second preferred embodiment comprises a power clamp 30 exerting a first clamping force on electrode 10, a first slipping sleeve 32 exerting a second clamping force on electrode 10 and a second slipping sleeve 34 exerting a third clamping force on electrode 10. Slipping sleeves 32 and 34 have a hollow cylindrical interior through which electrode 10 extends. Both the first and second slipping sleeves 32,34 are movable relative to the stationary components of electrode column 28, including power clamp 30. Preferably, the first and second slipping sleeves 32,34 are independently movable relative to one another.

Downward feeding of electrode 10 is accomplished by simultaneously exerting downward, axially directed forces $A_1$ and $A_2$ on slipping sleeves 32 and 34 while maintaining the first, second and third clamping forces on electrode 10. The magnitudes of the first, second and third clamping forces are selected such that the combined magnitude of forces $A_1$, $A_2$ and the weight W of electrode 10 are greater than the frictional resistive force $R_1$ exerted on electrode 10 by power clamp 30. Accordingly, the application of downward forces $A_1$ and $A_2$ results in downward axial movement of the electrode 10 relative to the stationary components of electrode column 28, including power clamp 30. Therefore, the electrode 10 is caused to slip downwardly through the power clamp 30, to the position shown in FIG. 2b, thus feeding the electrode 10 by an amount "x" into the furnace. FIG. 2b illustrates the position of electrode 10 and the configuration of electrode column 28 after this operation.

Preferably, the slipping sleeves 32 and 34 are returned to their initial positions one at a time, as illustrated in FIG. 2b to 2d. As shown in FIG. 2b, the first slipping sleeve 32 is moved upwardly to its initial position by application of an upwardly directed force $B_1$. The magnitude of force $B_1$ is less than the combined magnitudes of resistive frictional force $R_1'$ of power clamp 30, $R_2'$ of second slipping sleeve 34 and the weight W of electrode 10. Accordingly, movement of only the first slipping sleeve 32 upwardly, while maintaining the first, second and third clamping forces, results in upward axial movement of the first slipping sleeve 32 relative to the electrode 10 and to the remainder of electrode column 28.

Similarly, FIG. 2c illustrates the return of second slipping sleeve 34 to its initial position by application of axially upwardly directed force $B_2$ on only the second slipping sleeve. As shown in FIG. 2c, the magnitude of upward force $B_2$ is less than the combined magnitude of resistive frictional forces $R_1'$ and $R_2'$ of power clamp 30 and first slipping sleeve 32, and the weight W of electrode 10. Accordingly, upward movement of only the second slipping sleeve 34, while maintaining the first, second and third clamping forces, results in axial movement of the second slipping sleeve 34 relative to the electrode 10. After return of slipping sleeves 32,34 to their initial positions, the electrode 10 and electrode column 28 have the configurations shown in FIG. 2d.

One advantage of using the electrode column 28 of the second preferred embodiment is that it can also accomplish "back slipping", or upward feeding, of electrode 10. This may be required to correct for inadvertent, excessive downward slipping, or to compensate for a rapidly increasing level of molten material in the furnace. Back slipping is now explained with reference to FIG. 3a to 3d.

Electrode 10 is fed upwardly by simultaneous application of upward, axially directed forces $B_1$ and $B_2$ on the first and second slipping sleeves 32,34. The magnitudes of the clamping forces are selected such that the combined magnitude of upward forces $B_1$ and $B_2$ is greater than the weight W of electrode 10 combined with the resistive frictional force $R_1$ of power clamp 30. Accordingly, application of upward forces $B_1$ and $B_2$ results in upward axial movement of the electrode 10 relative to the stationary components of electrode column 28, including power clamp 30. Therefore, the electrode 10 is caused to slip upwards through the power clamp 30 to the position shown in FIG. 3b, thus withdrawing the electrode 10 by an amount "X" from the furnace.

The return of the slipping sleeves 32,34 to their initial positions is illustrated in FIGS. 3b and 3c. In FIG. 3b, an axial, downwardly directed force $A_1$ is applied only to the second slipping sleeve 34. The magnitudes of the forces are selected such that the combination of downward force $A_1$ and the electrode weight W is less than the combined resistive forces $R_1'$ and $R_2'$ of the power clamp 30 and first slipping sleeve 32. Accordingly, the second slipping sleeve 34 moves downwardly relative to electrode 10 and the stationary components of the electrode column 28, to the position shown in FIG. 3c. Similarly, the first slipping sleeve 32 is moved downwardly as shown in FIG. 3c by application of downward axial force $A_2$ which, in combination with electrode weight W, is insufficient to overcome resistive forces $R_1'$ and $R_3'$ of the power clamp 30 and the second slipping sleeve 34, respectively. Accordingly, the first slipping sleeve 32 moves downwardly relative to electrode 10 and relative to the stationary components of electrode column 28 to the position shown in FIG. 3d.

Figure 5:
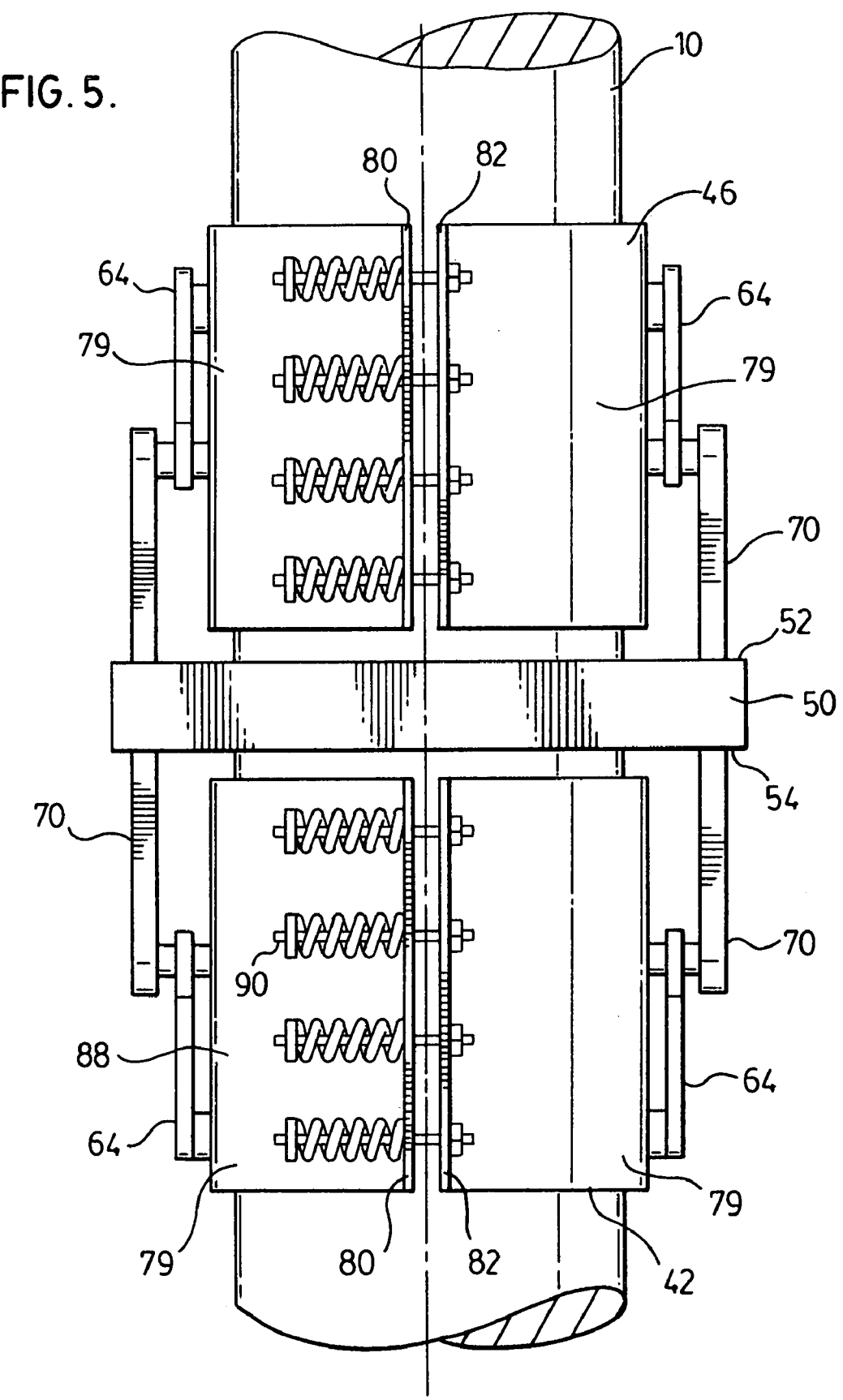
FIG. 5 is a front elevation of a preferred electrode slipping system according to the invention having two movable slipping sleeves.

FIG. 4 to 6 illustrate a preferred electrode slipping system according to the present invention, comprising a slipping clamp assembly 40 for holding an electrode 10 and for raising and lowering the electrode along a longitudinal axis L (FIG. 4) defined by the electrode 10.

The slipping clamp assembly 40 comprises a first, or lower, slipping sleeve 42 for exerting a first radial clamping force on electrode 10. The first slipping sleeve 42 is cylindrical and has a hollow cylindrical interior 44 through which electrode 10 extends. The slipping clamp assembly 40 also comprises a second, or upper, slipping sleeve 46 for exerting a second radial clamping force on electrode 10. The second slipping sleeve 46 is also cylindrical and has a hollow cylindrical interior 48 through which electrode 10 extends.

The slipping clamp assembly 40 further comprises a slipping clamp frame 50, having an upper surface 52 to which the second slipping sleeve 46 is connected and a lower surface 54 to which the first slipping sleeve 42 is connected. As shown in FIG. 4, the slipping sleeves 42 and 46 are axially spaced relative to one another and are located below and above the slipping clamp frame 50, respectively. Although not shown in the drawings, the slipping clamp frame 50, the slipping clamp assembly 40 and the other components of the electrode column are preferably supported and positioned by one or more support members. For example, the slipping clamp frame 50 and other components of the electrode column may be suspended by hydraulic cylinders or wire ropes (not shown) from one or more overhead girders (not shown) or the like.

The first and second slipping sleeves 42,46 of assembly 40 are independently movable relative to one another, and to the slipping clamp frame 50, along the longitudinal axis L. Thus, the slipping clamp assembly 40 is analogous to the assembly described above with reference to FIGS. 2a to 2d and 3a to 3d, which incorporates individually movable slipping sleeves 32 and 34, and is able to feed the electrode 10 upwardly and downwardly along axis L. The operation of slipping clamp assembly 40 will be further described below.

As mentioned above, the slipping sleeves 42 and 46 are movably connected to the slipping clamp frame 50. Each slipping sleeve 42,46 is preferably connected to frame 50 by at least one force-generating device by which the sleeves 42, 46 can be moved along the longitudinal axis. In the preferred embodiment, each force-generating device comprises a fluid-pressurized mechanism 56 through which each slipping sleeve 42, 46 is connected to the frame 50. The fluid-pressurized mechanism 56 may preferably be actuated by hydraulics or pneumatics. In the preferred embodiment described below, the fluid-pressurized mechanism 56 is hydraulically actuated, and comprises a hydraulic cylinder 58.

The hydraulic or pneumatic cylinder 58 can be extended and retracted along the longitudinal axis and is rotatably connected to a cylinder clevis at each of its opposite ends. As shown in FIG. 4, one end of each cylinder 58 is attached to the frame 50 through a first cylinder clevis 60. The other end of each hydraulic cylinder 58 is attached by a second cylinder clevis 62 to a lever arm 64.

Each lever arm 64 is generally transverse to the longitudinal axis, having a first end 66 through which it is secured to hydraulic cylinder 58 by cylinder clevis 62, and having a second end 68 through which it is rotatably attached to the upper or lower surface 52,54 of frame 50 by an arm clevis 70. As shown in FIG. 6, the lever arms 64 are substantially tangential to the cylindrical slipping sleeves 42, 46, with a central portion 72 of each lever arm 64 being rotatably connected to a slipping sleeve 42 or 46 by a rotatable connection 74. As shown in FIG. 4, the rotatable connection 74 may comprise a pin 75 projecting from each side of the slipping sleeve 42 or 46, the pin 75 engaging an oversized hole 77 in a central portion 72 of one of the lever arms 64. Thus, the ends 66 and 68 of each lever arm 64 are rotatably connected to cylinder clevis 62 and arm clevis 70, and the central portion 72 of each lever arm 64 is rotatably connected to a slipping sleeve 42 or 46. It will be appreciated that other types of combined connections which are rotatable and translatable horizontally are known to persons skilled in the art and may be used instead of the pin 75 and oversized hole 77 arrangement shown in FIG. 4.

It will be seen from the front view of FIG. 5 and the plan view of FIG. 6 that each slipping sleeve 42,46 is provided with a pair of lever arms 64. The paired lever arms 64 of each slipping sleeve 42, 46 are substantially parallel to one another, extending along opposite sides of the slipping sleeve 42, 46. As shown in the plan view of FIG. 6, the first ends 66 of each pair of lever arms are secured to opposite ends of a lever cross member 76, with each cross member having a central portion 78 between its ends through which it is connected to the frame 50 by fluid-pressurized mechanism 56.

Having now described the components of slipping clamp assembly 40, the following is a description of how actuation of fluid-pressurized mechanisms 56 will result in axial movement of slipping sleeves 42,46. For example, longitudinal extension of the hydraulic cylinder 58 associated with lower slipping sleeve 42 results in downward displacement of the first ends 66 of lever arms 64, together with cross member 76 and the slipping sleeve 42. The second ends 66 of lever arms 64 are pivoted about the arm devises 70, with the central portions 72 of lever arms 64 being displaced downwardly with some rotation about connections 70 and 74. Due to the rotation of the central portion 72 of lever arm about pivot 70, connection 74 moves relative to oversized hole 77. Retraction of hydraulic cylinder 58 will similarly result in upward displacement of slipping sleeve 42 back to its initial position shown in FIGS. 4 and 5.

The upper slipping sleeve 46 is displaced upwardly from its initial position by extending the hydraulic cylinder 58 to which it is connected. Extension of cylinder 58 results in upward displacement of the first ends 66 of lever arms 64, together with cross member 76 and the attached slipping sleeve 46. The second ends 68 of lever arms 64 are pivoted about arm devises 70 and the central portion 72 is rotated about connection 74 and 70 as described above. Retraction of hydraulic cylinder 58 results in downward displacement of slipping sleeve 46 back to its initial position shown in FIGS. 4 and 5.

The slipping sleeves 42,46 are of relatively simple construction, each comprising a substantially cylindrical shell 79. Each of the shells 79 has two attachment flanges 80,82 which are substantially parallel to one another and which are biased toward one another by slipping clamp springs 88 acting on spacer rods 90 so that the slipping sleeves 42,46 exert a radially inwardly directed clamping force on electrode 10. As shown in FIG. 5, the flanges 80,82 are biased by a single spring 88 or a plurality of axially spaced springs 88 located at one end of a spacer rod 90. It will be appreciated that the flanges 80, 82 can instead be biased by slipping clamp springs arranged in pairs, with the springs 88 of each pair being positioned at the ends of spring rods 90 to either side of the flanges 80 and 82. It is to be noted that the slipping sleeves 42,46 preferably have no means of releasing the clamping pressure on electrode 10, since release of clamping pressure is neither required or desired in the present invention. It will be appreciated that biasing together of flanges 80,82 is not necessarily accomplished by spring pressure, and that other means of biasing the flanges 80,82 may instead be used. For example, the biasing force may be generated by hydraulic or pneumatic devices provided on the shell 79.

Although the invention has been described in connection with certain preferred embodiments, it is not intended to be limited thereto. Rather, the invention is intended to include all embodiments which may fall within the scope of the following claims.

What is claimed is:

1. In combination, a consumable electrode and an electrode column for an electric arc furnace, said electrode being movable downwardly along a longitudinal axis defined by the electrode, said electrode column comprising:
   (a) a power clamp through which electrical power is delivered to the electrode, the power clamp comprising an annular contact element through which the electrode extends and which is in contact with the electrode, the power clamp exerting a first clamping force on the electrode through said annular contact element;
   (b) a first slipping sleeve having a hollow cylindrical interior through which the electrode extends and exerting a second clamping force on the electrode, the first slipping sleeve being axially movable and being movable relative to the electrode and the power clamp; and
   (c) a second slipping sleeve having a hollow cylindrical interior through which the electrode extends and exerting a third clamping force on the electrode, the second slipping sleeve being axially movable and being movable relative to the electrode, the power clamp and the first slipping sleeve;
   wherein the power clamp and the slipping sleeves together support the electrode and wherein the first, second and third clamping forces are selected such that simultaneous downward axial movement of the first and second slipping sleeves, while maintaining the first, second and third clamping forces, results in downward axial movement of the electrode relative to the power clamp, and such that upward or downward axial movement of only one of the first and second slipping sleeves, while maintaining the first, second and third clamping forces, results in axial movement of said one of the first and second slipping sleeve relative to the electrode.

2. The consumable electrode and electrode column of claim 1, wherein the first, second and third clamping forces are selected such that upward axial movement of only the first or second slipping sleeve, while maintaining the first, second and third clamping forces, further results in substantially no movement of the electrode relative to the power clamp and the second slipping sleeve.

3. The consumable electrode and electrode column of claim 1, wherein the first, second and third clamping forces are selected such that simultaneous upward axial movement of the first and second slipping sleeves, while maintaining the first, second and third clamping forces, results in upward axial movement of the electrode relative to the power clamp.

4. The consumable electrode and electrode column of claim 1, wherein the electrode column further comprises a slipping clamp frame to which the first and second slipping sleeves are attached, the slipping clamp frame remaining stationary relative to the power clamp during axial movement of the electrode.

5. The consumable electrode and electrode column of claim 4, wherein the electrode column further comprises at least one first fluid-pressurized cylinder for axially moving the first slipping sleeve, said at least one first fluid-pressurized cylinder being attached to the slipping clamp frame.

6. The consumable electrode and electrode column of claim 5, wherein the slipping clamp assembly further comprises one or more first lever arms, each of which is connected to the at least one first fluid-pressurized cylinder and to the first slipping sleeve.

7. The consumable electrode and electrode column of claim 6, wherein each of the first lever arms is pivotably and horizontally translationally secured to the first slipping sleeve.

8. The consumable electrode and electrode column of claim 1, wherein the second clamping force is produced by radially inwardly directed biasing of the first slipping sleeve.

9. The consumable electrode and electrode column of claim 8, wherein the biasing is provided by biasing means selected from spring pressure, hydraulic pressure and pneumatic pressure.

10. The consumable electrode and electrode column of claim 1, wherein the annular contact element comprises a plurality of radially inwardly biased contact elements, each of the contact elements being biased inwardly at two points of pressure.

11. A slipping clamp assembly for holding an axially-extending electrode and for axially raising and lowering the electrode, the slipping clamp assembly, comprising:
   (a) a first slipping sleeve for exerting a first clamping force on the electrode, the first slipping sleeve having a hollow cylindrical interior to receive the electrode;
   (b) a second slipping sleeve for exerting a second clamping force on the electrode, the second slipping sleeve having a hollow cylindrical interior to receive the electrode, the first and second slipping sleeves being axially spaced apart; and
   (c) a slipping clamp frame to which both slipping sleeves are connected, both the first and second slipping sleeves being axially movable relative to the frame and independent of one another.

12. The slipping clamp assembly of claim 11, further comprising:
  (d) fluid-pressurized cylinder devices attached to the slipping clamp frame for axially moving the first and second slipping sleeves;
  wherein each of the slipping sleeves is connected to at least one of the fluid-pressurized devices.

13. A method of axially moving an electrode relative to an electric arc furnace, the electrode being supported by a power clamp and by a slipping clamp assembly, the slipping clamp assembly comprising a first slipping sleeve having a hollow interior through which the electrode extends and a second slipping sleeve having a hollow interior through which the electrode extends, the method comprising:
  (a) applying a first clamping force to the electrode, the first clamping force being applied by the power clamp;
  (b) applying a second clamping force to the electrode, the second clamping force being applied by the first slipping sleeve;
  (c) applying a third clamping force to the electrode, the third clamping force being applied by the second slipping sleeve; and
  (d) simultaneously applying an axially downwardly directed force on each of the first slipping sleeve and the second slipping sleeve while maintaining the first, second and third clamping forces on the electrode, wherein a combination of the downwardly directed forces on the slipping sleeves and a downward force of the electrode are greater than a resistive frictional force of the power clamp, resulting in downward axial displacement of the first and second slipping sleeves and the electrode relative to the power clamp and the furnace.

14. The method of claim 13, further comprising:
  (d) applying an axially upwardly directed force on only one of the first and second slipping sleeve while maintaining the first, second and third clamping forces on the electrode, wherein the upwardly directed force on said one slipping sleeve is insufficient to overcome a resistive frictional force of the power clamp, resulting in upward displacement of said one slipping sleeve relative to the electrode and the power clamp.

15. A method of axially moving an electrode relative to an electric arc furnace, the electrode being supported by a power clamp and by a slipping clamp assembly, the slipping clamp assembly comprising a first slipping sleeve having a hollow interior through which the electrode extends, and a second slipping sleeve having a hollow interior through which the electrode extends, the method comprising:
  (a) applying a first clamping force to the electrode, the first clamping force being applied by the power clamp;
  (b) applying a second clamping force to the electrode, the second clamping force being applied by the first slipping sleeve;
  (c) applying a third clamping force to the electrode, the third clamping force being applied by the second slipping sleeve; and
  (d) simultaneously applying an axially upwardly directed force on each of the first slipping sleeve and the second slipping sleeve while maintaining the first, second and third clamping forces on the electrode, wherein a combination of the upwardly directed forces on the slipping sleeves is greater than a downward force of the electrode and a resistive frictional force of the power clamp, resulting in upward axial displacement of the slipping sleeves and the electrode relative to the power clamp and the furnace.

16. The consumable electrode and electrode column of claim 4, wherein the electrode column further comprises at least one second fluid-pressurized cylinder for axially moving the second slipping sleeve, said at least one second fluid-pressurized cylinder being attached to the slipping clamp frame.

17. The consumable electrode and electrode column of claim 16, wherein the slipping clamp assembly further comprises one or more second lever arms, each of which is connected to the at least one second fluid-pressurized cylinder and to the second slipping sleeve.

18. The consumable electrode and electrode column of claim 17, wherein each of the second lever arms is pivotably and horizontally translationally secured to the second slipping sleeve.

* * * * *